(12) United States Patent
Haque et al.

(10) Patent No.: US 8,982,948 B2
(45) Date of Patent: Mar. 17, 2015

(54) VIDEO SYSTEM WITH QUANTIZATION MATRIX CODING MECHANISM AND METHOD OF OPERATION THEREOF

(75) Inventors: Munsi Haque, San Jose, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 580 days.

(21) Appl. No.: 13/333,064

(22) Filed: Dec. 21, 2011

(65) Prior Publication Data

US 2013/0163662 A1 Jun. 27, 2013

(51) Int. Cl.
*H04N 7/12* (2006.01)
*H04N 11/02* (2006.01)
*H04N 11/04* (2006.01)

(52) U.S. Cl.
USPC ............. 375/240.03; 375/240.01; 375/240.18

(58) Field of Classification Search
None
See application file for complete search history.

(56) References Cited

U.S. PATENT DOCUMENTS

| 6,091,774 | A | 7/2000 | Hyodo et al. |
| 7,660,351 | B2 | 2/2010 | Varma et al. |
| 7,848,541 | B2 | 12/2010 | Gural |
| 7,860,159 | B2 | 12/2010 | Shen et al. |
| 2005/0238241 | A1* | 10/2005 | Koo ............................. 382/232 |
| 2009/0257668 | A1* | 10/2009 | Ye et al. ....................... 382/233 |
| 2009/0297054 | A1* | 12/2009 | Regunathan et al. ......... 382/248 |

OTHER PUBLICATIONS

Tanaka et al., "Quantization Matrix for HEVC", 24 pages, 5th Meeting: Geneva, Switzerland, Mar. 16-23, 2011.

* cited by examiner

*Primary Examiner* — Joseph Ustaris
*Assistant Examiner* — Kevin McInnish
(74) *Attorney, Agent, or Firm* — Ishimaru Associates LLP

(57) ABSTRACT

A method of operation of a video system includes: generating a quantization matrix for a video input data, the quantization matrix having a corner seed and a right-bottom sub-quad coefficient estimated based on the corner seed; generating a video bitstream based on the quantization matrix; and generating a reconstructed video data with the video bitstream for displaying on a video device.

20 Claims, 5 Drawing Sheets

VIDEO SYSTEM WITH QUANTIZATION MATRIX CODING MECHANISM AND METHOD OF OPERATION THEREOF

TECHNICAL FIELD

The present invention relates generally to a video system, and more particularly to a system for a video system with quantization.

BACKGROUND ART

In digital video systems, such as a video camera, a video recorder, a digital camcorder, a set-top digital cable television box, a direct broadcast satellite (DBS) television, a terrestrial digital television, a digital videodisc player (DVDP), a conversational television, a video on demand (VOD), and a video network server, an effective image compression is important. Video contains a continuous amount of data representing moving pictures. The amount of data needed to transfer pictures is high compared with many other types of media.

A video sequence consists of a series of still images or frames. Video compression methods are based on reducing the redundancy and perceptually irrelevant parts of video sequences. The redundancy in video sequences can be categorized into spatial, temporal, and spectral redundancy.

Spatial redundancy means the correlation between neighboring pixels within a frame. Temporal redundancy means the correlation between areas of successive frames. Temporal redundancy arises from the likelihood of objects appearing in a previous image also appearing in the current image. Compression can be achieved by generating motion compensation data, which describes the motion (i.e. displacement) between similar areas of the current and a previous image. The current image is thus predicted from the previous one. Spectral redundancy means the correlation between the different color components of the same image.

Video compression methods typically differentiate between images, which do or do not utilize temporal redundancy reduction. Compressed images which do not utilize temporal redundancy reduction methods are usually called INTRA or I-frames whereas temporally predicted images are called INTER or P-frames (and also B-frames when the INTER frames may be predicted in a forward or backward manner). In the INTER frame case, the predicted (motion-compensated) image is rarely precise enough and therefore a spatially compressed prediction error image is a part of each INTER frame.

A video includes a series of frames taken over time. For example, a sensor can be used that captures an image. The image can be saved as one of a series of frames in some form of memory. By taking a series of frames over time, such as 60 frames per second, a video may be formed that can be watched by a user. In order for the sensor to function, typically, the sensor is mounted in housing and an optics module is used to focus the desired image in the focal plane on the sensor so that the image can be processed and stored. The housing, optics module and the sensor are part of the platform and the overall system is familiar to a person of skill in the art.

Thus, a need still remains for a video system with quantization matrix for increasing levels of functionality. In view of ease of use, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a video system including: generating a quantization matrix for a video input data, the quantization matrix having a corner seed and a right-bottom sub-quad coefficient estimated based on the corner seed; generating a video bitstream based on the quantization matrix; and generating a reconstructed video data with the video bitstream for displaying on a video device.

The present invention provides a video system, including: an encoder prediction unit for generating a quantization matrix for an video input data, the quantization matrix having a corner seed and a right-bottom sub-quad coefficient estimated based on the corner seed; a variable length coding unit, coupled to the encoder prediction unit, for generating a video bitstream based on the quantization matrix; and a decoder prediction unit, coupled to the variable length coding unit, for generating a reconstructed video data with the video bitstream for displaying on a video device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
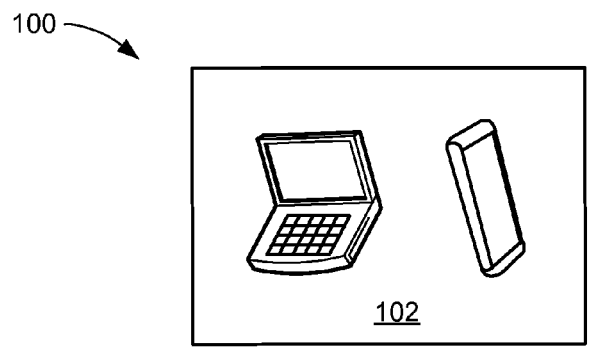
FIG. 1 is a video system with quantization coding mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, passive devices, a camera, a camcorder, a user interface, a control unit, a storage unit, a display device, or a combination thereof.

The term "interpolation" referred to herein means calculation of a value between known values that are either pre-selected or pre-calculated.

Referring now to FIG. 1, therein is shown a video system 100 with quantization coding mechanism in an embodiment of the present invention. The video system 100 can include video technology including quantization matrix (Q-matrix) coding for High-Efficiency Video Coding (HEVC). The video system 100 can provide coefficient interpolation techniques that can be incorporated into a High Efficiency Video Coding (HEVC) test model (HM).

The video system 100 can include a video device 102. The video device 102 is defined as an electronic machine capable of storing and computing digital data. For example, the video device 102 can be of any of a variety of mobile devices, such as a video camera, a video recorder, a camcorder, a cellular phone, a personal digital assistant, a tablet, a notebook computer, a tablet PC, a tabletop computer, a smart surface, or other multi-functional mobile communication or entertainment devices. The video device 102 can include an image sensor or an image capture device. The device can include a display device for presenting multimedia information including video, audio, images, and text. The video device 102 can be a standalone device, or can be incorporated with a larger electronic system, for example a home theatre system, a personal computer, or a vehicle.

In another example, the video device 102 can be an electronic machine, such as a mainframe, a server, a cluster server, rack mounted server, or a blade server, or as more specific examples, an IBM System z10™ Business Class mainframe or a HP ProLiant ML™ server. Yet another example, the video device 102 can be a specialized machine, such as a streaming entertainment device, a portable computing device, a digital camera, a thin client, a notebook, a netbook, a smartphone, personal digital assistant, or a cellular phone, and as specific examples, a Sony Cyber-shot Camera™, a Sony Full HD 3D Camcorder, a Sony VAIO Computer™, a Samsung Galaxy Tab™, a Samsung 55" Class LED 8000 Series Smart TV, a Samsung 3D Blu-ray Disc Player™, an Apple iPad™, an Apple iPhone™, a Palm Centro™, or a MOTO Q Global™.

For illustrative purposes, the video system 100 is described with the video device 102 as a mobile computing device, although it is understood that the video device 102 can be different types of computing devices. For example, the video device 102 can also be a non-mobile computing device, such as a server, a server farm, or a desktop computer.

Figure 2:
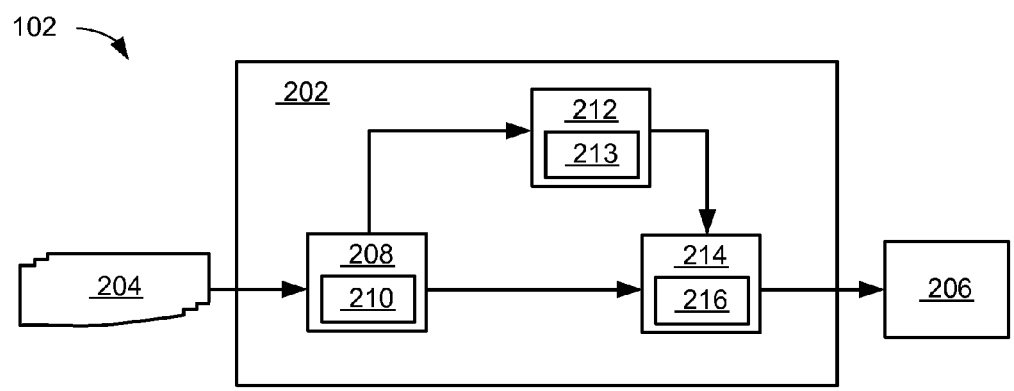
FIG. 2 is a block diagram of the video device with a flow of data in an encoding phase.

Referring now to FIG. 2, therein is shown a block diagram of the video device 102 with a flow of data in an encoding phase. The video device 102 can include a video encoder 202, which is defined as a hardware block that performs video compression for digital video. The video encoder 202 can include a compression operation including lossless or lossy data compression.

The video encoder 202 can process a video input data 204, which is defined as video information generated with a capture device or an image sensor. For example, the video input data 204 can represent input matrix of sample or source data.

The video encoder 202 can generate a video bitstream 206, which is defined as compressed information of the video input data 204. The video bitstream 206 is a sequence of bits that forms a representation of coded pictures and associated data forming one or more coded video sequences. For example, the video bitstream 206 can include a coded picture or a coded representation of a picture.

The video encoder 202 can include an encoder prediction unit 208, which is defined as a hardware block that calculates quantization coefficients 210 for a quantization operation. The quantization coefficients 210 are defined as numerical values that are used by a lossy compression technique to compress a range of values to a single value.

The encoder prediction unit 208 provides an estimate of a sample value or a data element of the quantization coefficients 210. Each of the quantization coefficients 210 can be estimated and encoded based on numerical values of neighbor coefficients that are adjacent each of the quantization coefficients 210. Estimation of the quantization coefficients 210 will be subsequently discussed in more details.

The video encoder 202 can include a residual coding unit 212, which is defined as a hardware block that generates residual information 213 of the coded data. The residual information 213 is defined as errors of prediction of encoded data in a compression operation. The residual information 213 can be calculated based on differences between expected numerical values and predicted numerical values of the quantization coefficients 210.

The video encoder 202 can include a variable length coding unit 214, which is defined as a hardware unit that generates the video bitstream 206 using an entropy coding 216. The entropy coding 216 is defined as a compression operation of encoding video information using fewer bits than those in the original representation of the video information. The entropy coding 216 can be used to encode the quantization coefficients 210, the residual information 213, or a combination thereof.

The entropy coding 216 can include a compression operation that is based on statistical redundancy to assign shorter bit strings to symbols that are likely to be more frequent and longer bit strings to symbols that are likely to be less frequent. The entropy coding 216 can compress the quantization coefficients 210, the residual information 213, or a combination thereof by replacing each input symbol in the quantization coefficients 210, the residual information 213, or a combination thereof by a corresponding variable-length output codeword.

A length of the variable-length output codeword is approximately proportional to a negative logarithm of the probability of how likely the input symbol occurs. The input symbol that most frequent occurs can be replaced with the variable-length output codeword that is the shortest code.

The variable length coding unit 214 can receive the quantization coefficients 210 from the encoder prediction unit 208, the residual information 213 from the residual coding unit 212, or a combination thereof to generate the video bitstream 206. If lossless compression mode is selected, the variable length coding unit 214 processes the quantization coefficients 210 and the residual information 213. Otherwise, the variable length coding unit 214 processes only the quantization coefficients 210.

Lossless compression is defined as a data compression operation that allows exact original video data to be reconstructed from compressed video data. The term lossless compression is in contrast to lossy compression, which allows an approximation of original data to be reconstructed, in exchange for better compression rates.

The encoder prediction unit 208 can be coupled to the residual coding unit 212 and the variable length coding unit 214. The residual coding unit 212 can be coupled to the variable length coding unit 214.

It has been discovered that the encoder prediction unit 208 provides improved quality by generating the quantization coefficients 210 with reduced prediction errors with better prediction of coefficients using neighbor coefficients resulting in a performance improvement of video coding for High Efficiency Video Coding (HEVC) and a performance improvement over one of coding modes in Axis Mode coding.

Figure 3:
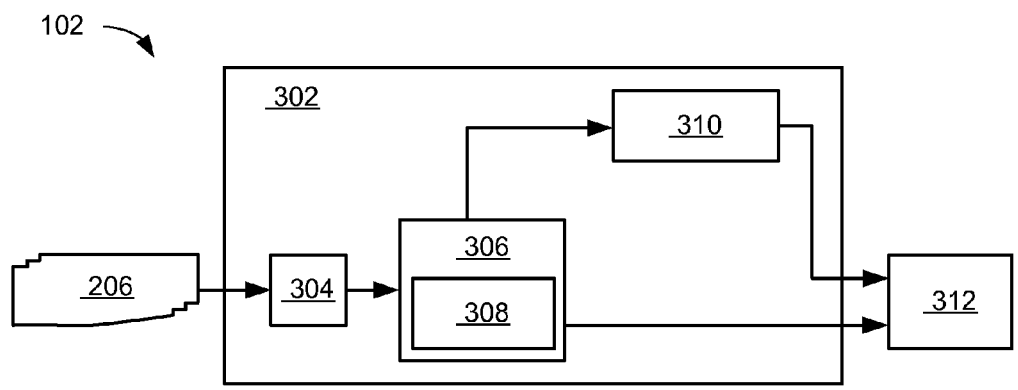
FIG. 3 is a block diagram of the video device with a flow of data in a decoding phase.

Referring now to FIG. 3, therein is shown a block diagram of the video device 102 with a flow of data in a decoding phase. The decoding phase is an inversion of each stage of the encoding phase, except for inverse quantization. The video device 102 can include a video decoder 302, which is defined as a hardware block that performs video decompression for encoded digital video.

The video decoder 302 reads the video bitstream 206 to derive decoded pictures or video. The video decoder 302 can include a variable length decoding unit 304, which is defined as a hardware block that generates symbols from bit strings in the video bitstream 206 using entropy decoding.

The video decoder 302 can include a decoder prediction unit 306, which is defined as a hardware block that calculates dequantization coefficients 308 for an inverse quantization operation. The dequantization coefficients 308 are defined as numerical values that are used by a decompression operation that allows an image to be displayed with a set of colors where each color is associated with its nearest representative. The decoder prediction unit 306 can re-build or regenerate the quantization coefficients 210 of FIG. 2 sent by an encoder including the video encoder 202 of FIG. 2.

The video decoder 302 can include a residual decoding unit 310, which is defined as a hardware block that derives the residual information 213 of FIG. 2 from decoder prediction data of the decoder prediction unit 306. The residual decoding unit 310 can generate a reconstructed video data 312 with information from the video bitstream 206.

The reconstructed video data 312 can be generated by decoding a residual error of prediction. The residual error can be de-quantized for lossy compression mode. The residual error can be decoded using Differential pulse-code modulation (DPCM) decoding or run length decoding. In DPCM, the residual error can be decoded using DPCM in raster scan order by Variable Length Coding (VLC).

In run length decoding, the residual error can be decoded by converting a series of run-length data values and count values to repeated series of a number of the data values based on the count values. The data values can include a number of zero values and non-zeroes values. The data values can be in a zigzag order.

The reconstructed video data 312 can be displayed on the video device 102. The reconstructed video data 312 is defined as video information decoded from a series of data bits. For example, the reconstructed video data 312 can include decoded pictures or video.

If lossless compression mode is selected, the residual decoding unit 310 generates the reconstructed video data 312 using the residual information 213 and the decoder prediction data. Otherwise, the decoder prediction unit 306 generates the reconstructed video data 312 based on the decoder prediction data.

The variable length decoding unit 304 can be coupled to the decoder prediction unit 306. The decoder prediction unit 306 can be coupled to the residual decoding unit 310.

Figure 4:
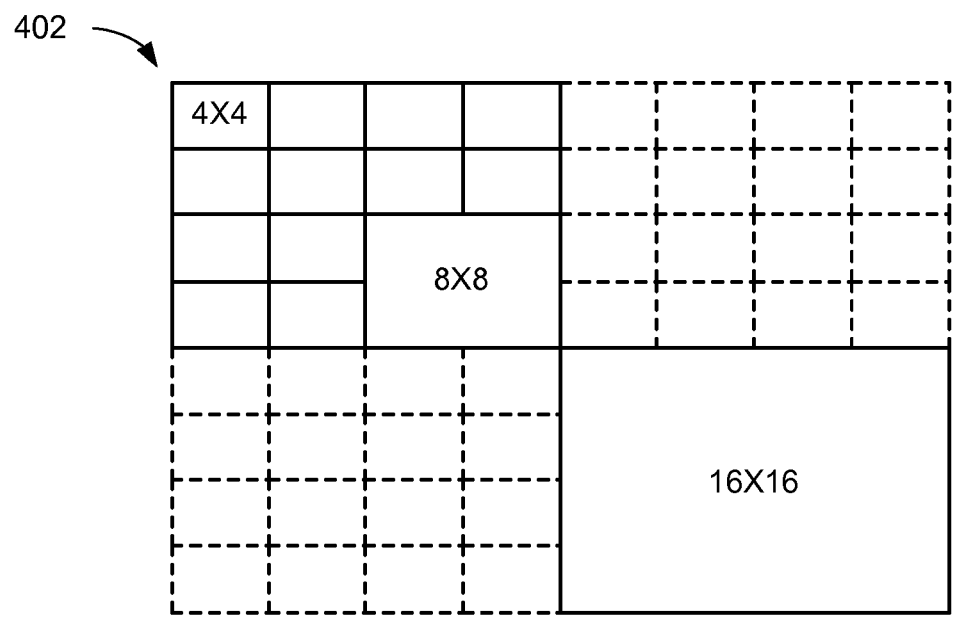
FIG. 4 is an exemplary diagram of segmentation by the encoder prediction unit of FIG. 2.

Referring now to FIG. 4, therein is shown an exemplary diagram of segmentation by the encoder prediction unit 208 of FIG. 2. The encoder prediction unit 208 can perform segmentation of the video input data 204 of FIG. 2 into a number of segments of image samples.

The encoder prediction unit 208 can generate a quantization matrix 402 for each of the segments. The quantization matrix 402 is defined as an array of the quantization coefficients 210 of FIG. 2. The exemplary diagram depicts the quantization matrix 402 of 32×32. A smallest grid, which is one of the segments, in the quantization matrix 402 is a 4×4 matrix. The quantization matrix 402 can be sent in a lossless compression mode by the variable length coding unit 214 of FIG. 2 with the residual coding unit 212 of FIG. 2.

The quantization matrix 402 can represent a transform unit (TU), which is a unit used for transformation and quantization operations. The quantization matrix 402 is a square array or a square matrix with the same number of columns and rows of the quantization coefficients 210. For example, the quantization matrix 402 can represent an N×N array with N columns and N rows 0. Also for example, the quantization matrix 402 can include a size of 4×4, 8×8, 16×16, or 32×32.

Figure 5:
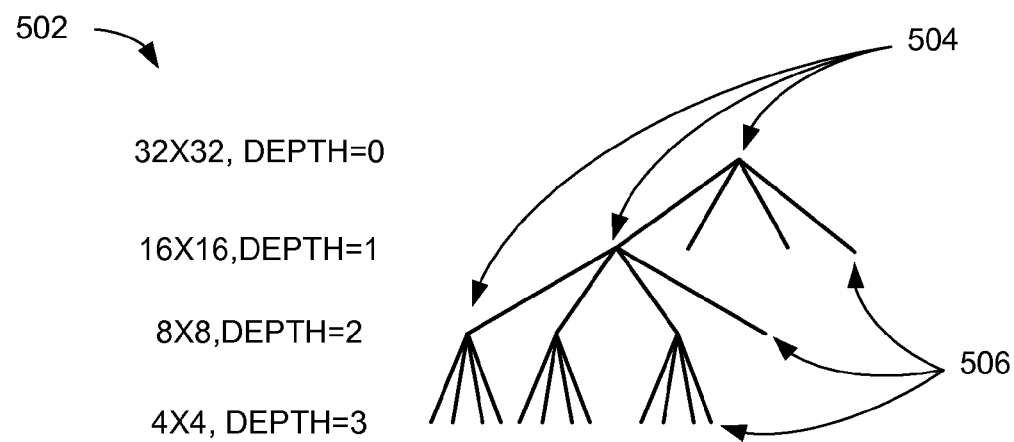
FIG. 5 is a diagram of a quadtree.

Referring now to FIG. 5, therein is shown a diagram of a quadtree 502. The quadtree 502 is defined as a tree in which each of parent nodes 504 is split into four child nodes 506. One of the child nodes 506 can become one of the parent nodes 504 for another split into another four of the child nodes 506. A number of the quantization matrix 402 of FIG. 4 can be arranged in the quadtree 502 with one of the child nodes 506 representing the quantization matrix 402.

The diagram depicts an example of the quadtree 502 of the quantization matrix 402 of 32×32. In this example, a 32×32 segment is at depth 0, a 16×16 segment is at depth 1, an 8×8 segment is at depth 2, and a 4×4 segment is at depth 3. Each of the segments can be coded separately and transmitted to a decoder. The encoder prediction unit 208 of FIG. 2 can use a hierarchical prediction scheme by traversing the quadtree 502 and code each of the segments at each depth level.

Figure 6:
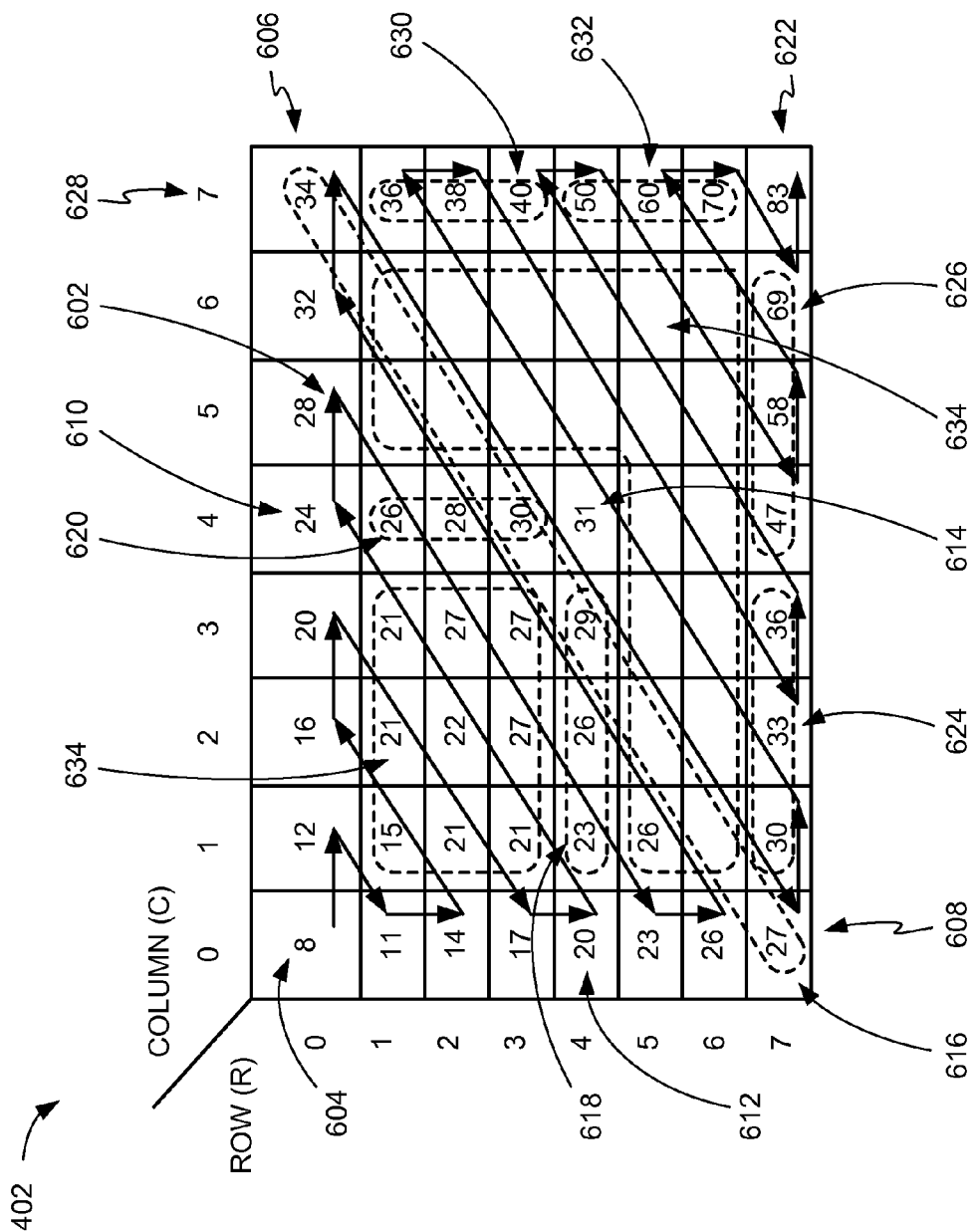
FIG. 6 is an exemplary diagram of the quantization matrix.

Referring now to FIG. 6, therein is shown an exemplary diagram of the quantization matrix 402. The exemplary diagram depicts the quantization matrix 402 as a square array of 8×8. Columns and rows of the quantization matrix 402 are labeled along the top side and left side, respectively, of the quantization matrix 402.

The exemplary diagram also depicts an order of a zigzag scan order 602, which is defined as a sequential ordering of transform coefficient levels from approximately the lowest spatial frequency to approximately the highest spatial frequency. The zigzag scan order 602 is used to group low frequency coefficients in the top of a vector. The zigzag scan order 602 provides an effective encoding order of the quantization coefficients 210 of FIG. 2 such that the quantization coefficients 210 can be statistically arranged from large to small magnitudes. Row 0, column 0 indicates the lowest spatial frequency. Row 7, column 7 indicates the highest spatial frequency.

The quantization matrix 402 can include corner seeds 604 at four corners of the quantization matrix 402. The corner seeds 604 are defined as numerical values of coefficients that are used as starting values for interpolation of other coefficients in the quantization matrix 402. The corner seeds 604 can include four numerical values at row 0, columns 0 and 7, and row 7, columns 0 and 7. For example, the corner seeds 604 can represent original coefficients.

The quantization matrix 402 can include a first row 606. The first row 606 is defined as a topmost horizontal axis of the quantization matrix 402. The first row 606 can represent row 0 in the quantization matrix 402.

The quantization matrix 402 can include a first column 608. The first column 608 is defined as a leftmost vertical axis of the quantization matrix 402. The first column 608 can represent column 0 in the quantization matrix 402.

The quantization matrix 402 can include a right-top sub-quad coefficient 610 and a left-bottom sub-quad coefficient 612. The right-top sub-quad coefficient 610 is defined as a numerical value of one of the quantization coefficients 210 that is in a left-top corner of a right-top 4×4 sub-quad of the quantization matrix 402. The right-top sub-quad coefficient 610 can represent QM[0][4] in the quantization matrix 402.

The left-bottom sub-quad coefficient 612 is defined as a numerical value of one of the quantization coefficients 210 that is in a left-top corner of a left-bottom 4×4 sub-quad of the quantization matrix 402. The left-bottom sub-quad coefficient 612 can represent QM[4][0].

The quantization matrix 402 can include a right-bottom sub-quad coefficient 614. The right-bottom sub-quad coefficient 614 is defined as a numerical value of one of the quantization coefficients 210 that is in a left-top corner of a right-bottom 4×4 sub-quad of the quantization matrix 402. The right-bottom sub-quad coefficient 614 can represent QM[4][4] in the quantization matrix 402.

The quantization matrix 402 can include a bottom-to-top diagonal 616. The bottom-to-top diagonal 616 is defined as a group of the quantization coefficients 210 from a left-bottom corner of the quantization matrix 402 to a right-top corner of the quantization matrix 402.

The quantization matrix 402 can include a middle row coefficient 618. The middle row coefficient 618 is defined as a numerical value of one of the quantization coefficients 210 that is in the first half of the middle row of the quantization matrix 402. The middle row coefficient 618 can represent one of the quantization coefficients 210 horizontally from QM[4][1] to QM[4][3].

The quantization matrix 402 can include a middle column coefficient 620. The middle column coefficient 620 is defined as a numerical value of one of the quantization coefficients 210 that is in the first half of the middle column of the quantization matrix 402. The middle column coefficient 620 can represent one of the quantization coefficients 210 vertically from QM[1][4] to QM[3][4].

The quantization matrix 402 can include a last row 622. The last row 622 is defined as a bottommost horizontal axis of the quantization matrix 402. The last row 622 can represent row 7 in the quantization matrix 402.

The quantization matrix 402 can include a first-half last row coefficient 624. The first-half last row coefficient 624 is defined as a numerical value of one of the quantization coefficients 210 that is in the first half of the last row 622. The first-half last row coefficient 624 can represent one of the quantization coefficients 210 horizontally from QM[7][1] to QM[7][3].

The quantization matrix 402 can include a second-half last row coefficient 626. The second-half last row coefficient 626 is defined as a numerical value of one of the quantization coefficients 210 that is in the second half of the last row 622.

The second-half last row coefficient 626 can represent one of the quantization coefficients 210 horizontally from QM[7][4] to QM[7][6].

The quantization matrix 402 can include a first half of a last column 628. The last column 628 is defined as a rightmost vertical axis of the quantization matrix 402. The last column 628 can represent column 7 in the quantization matrix 402.

The quantization matrix 402 can include a first-half last column coefficient 630. The first-half last column coefficient 630 is defined as a numerical value of one of the quantization coefficients 210 that is in the first half of the last column 628. The first-half last column coefficient 630 can represent one of the quantization coefficients 210 vertically from QM[1][7] to QM[3][7].

The quantization matrix 402 can include a second-half last column coefficient 632. The second-half last column coefficient 632 is defined as a numerical value of one of the quantization coefficients 210 that is in the second half of the last column 628. The second-half last column coefficient 632 can represent one of the quantization coefficients 210 vertically from QM[4][7] to QM[6][7].

The quantization matrix 402 can include remaining coefficients 634. The remaining coefficients 634 are defined as numerical values of the rest of the quantization coefficients 210 that have not been previously interpolated. The remaining coefficients 634 can represent the quantization coefficients 210 of from QM[1][1] to QM[1][3], QM[1][5], QM[1][6], from QM[2][1] to QM[2][3], QM[2][5], QM[2][6], from QM[3][1] to QM[3][3], QM[3][5], QM[3][6], QM[4][5], QM[4][6], from QM[5][1] to QM[5][6], and from QM[6][1] to QM[6][6].

Figure 7:
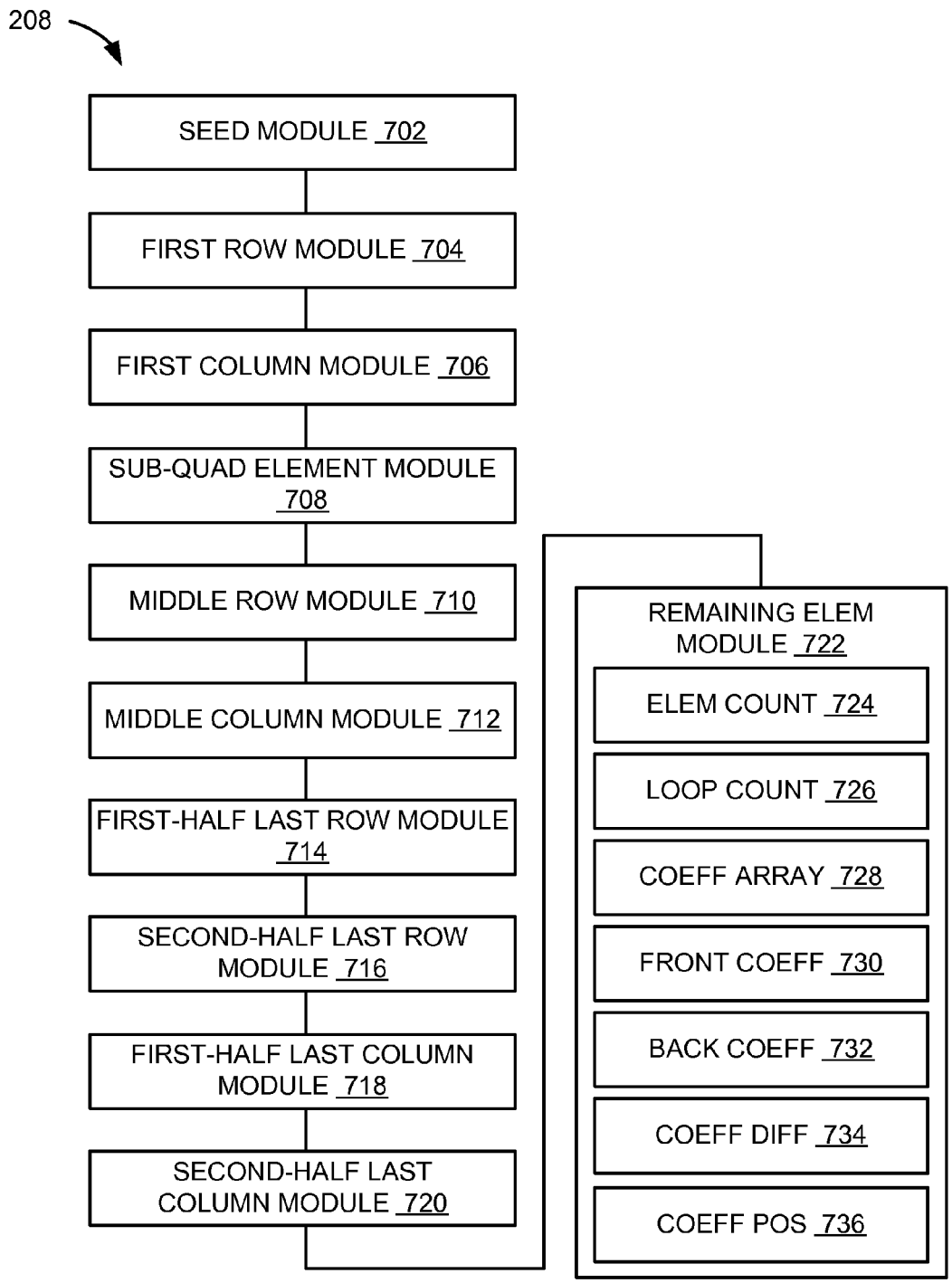
FIG. 7 is a control flow of the encoder prediction unit.

Referring now to FIG. 7, therein is shown a control flow of the encoder prediction unit 208. The encoder prediction unit 208 can include an interpolation operation to determine the quantization coefficients 210 of FIG. 2 of the quantization matrix 402 of FIG. 4. The encoder prediction unit 208 can perform the interpolation operation for the quantization matrix 402 with a default quantization matrix or a previously predicted quantization matrix at the beginning of the interpolation operation.

The encoder prediction unit 208 can execute the interpolation operation if there is no symmetry around top-left to bottom right diagonal axis. If there is symmetry, in which the upper right diagonal half is the same as the lower left diagonal half, a symmetrical coding can be used.

The encoder prediction unit 208 can include a seed module 702, which is a block that selects four of the corner seeds 604 of FIG. 6. The corner seeds 604 can be selected using numerical values at row 0, columns 0 and 7 and row 7, columns 0 and 7 of a default 8×8 matrix or an 8×8 matrix of a previously predicted quantization matrix. For example, the corner seeds 604 are shown as 8, 34, 27, and 83 in FIG. 6. Also for example, the seed module 702 can be implemented for depth=0 for the quantization matrix 402 of 8×8 in a structure of the quadtree 502 of FIG. 5.

The encoder prediction unit 208 can include a first row module 704, which is a block that estimates numerical values of the quantization coefficients 210 in the first row 606 of FIG. 6. The quantization coefficients 210 in the first row 606 can be estimated based on two of the corner seeds 604 in the first row 606. The quantization coefficients 210 can be estimated as follows.

$$QM[0][n]=QM[0][0]+n*((QM[0][N-1]-QM[0][0])/(N-2)) \qquad (1)$$

for n=1 to N−2 and N=8. The notation "QM[r][c]" referred to herein means a numerical value of one of the quantization coefficients 210 in the quantization matrix 402 at row 'r' and column 'c'. The quantization coefficients 210 can be estimated by calculating a sum of one of the corner seeds 604 and a product of 'n' and a difference between two of the corner seeds 604 with the difference divided by a quantity of two less than N. 'n' refers to a column of one of the quantization coefficients 210 being calculated. 'N' refers to a number of rows or columns of the quantization matrix 402.

The encoder prediction unit 208 can include a first column module 706, which is a block that estimates numerical values of the quantization coefficients 210 in the first column 608 of FIG. 6. The quantization coefficients 210 in the first column 608 can be estimated based on two of the corner seeds 604 in the first column 608. The quantization coefficients 210 can be estimated as follows.

$$QM[m][0]=QM[0][0]+m*((QM[N-1][0]-QM[0][0])/(N-2)) \quad (2)$$

for m=1 to N−2 and N=8.

The quantization coefficients 210 can be estimated by calculating a sum of one of the corner seeds 604 and a product of 'm' and a difference between two of the corner seeds 604 with the difference divided by a quantity of two less than N. 'm' refers to a row of one of the quantization coefficients 210 being calculated. 'N' refers to row and column size of the quantization matrix 402.

The first column module 706 can check the right-top sub-quad coefficient 610 of FIG. 6 and the left-bottom sub-quad coefficient 612 of FIG. 6. The first column module 706 can compare the right-top sub-quad coefficient 610 and the left-bottom sub-quad coefficient 612 to expected values.

If a difference between the right-top sub-quad coefficient 610 and an expected value and a difference between the left-bottom sub-quad coefficient 612 and an expected value are within a predetermined threshold, processing continues to the next level of interpolation. Expected values of the right-top sub-quad coefficient 610 and the left-bottom sub-quad coefficient 612 represent original values or pre-calculated values. Otherwise, processing continues by branching to the seed module 702 to process depth=1 for the quantization matrix 402 of 4×4 sub-quads as starting points.

The encoder prediction unit 208 can include a sub-quad element module 708, which is defined as a block that estimates a numerical value of one of the quantization coefficients 210 in a right-bottom 4×4 sub-quad of the quantization matrix 402. The sub-quad element module 708 can estimate the right-bottom sub-quad coefficient 614 of FIG. 6.

The right-bottom sub-quad coefficient 614 can be estimated based on two of the corner seeds 604 in the bottom-to-top diagonal 616 of FIG. 6. The right-bottom sub-quad coefficient 614 can be estimated as follows.

$$QM[N/2][N/2]=QM[N-1][0]+(N/2)*((QM[0][N-1]-QM[N-1][0])/(N-2)) \quad (3)$$

for N=8. A location of QM[4][4] can be close to the next position in the bottom-to-top diagonal 616.

The right-bottom sub-quad coefficient 614 can be estimated by calculating a sum of one of the corner seeds 604 and a product as a function of two of the corner seeds 604 and a number of rows or columns of the quantization matrix 402. The product can be calculated by multiplying a quantity of N divided by two and a difference between two of the corner seeds 604 with the difference divided by a quantity of two less than N. 'N' refers to row and column size of the quantization matrix 402.

The encoder prediction unit 208 can include a middle row module 710, which is defined as a block that estimates numerical values of the quantization coefficients 210 in a first half of a middle row of the quantization matrix 402. The middle row module 710 can estimate the middle row coefficient 618 of FIG. 6.

The middle row coefficient 618 can be estimated based on the left-bottom sub-quad coefficient 612 and the right-bottom sub-quad coefficient 614. The middle row coefficient 618 can be estimated as follows.

$$QM[N/2][n]=QM[N/2][0]+n*INT((QM[N/2][N/2]-QM[N/2][0])/(N/2-1)) \quad (4)$$

for n=1 to N/2−1 and N=8.

The middle row coefficient 618 can be estimated by calculating a sum of the left-bottom sub-quad coefficient 612 and a product of n and an integer component of a quantity of a difference of the right-bottom sub-quad coefficient 614 and the left-bottom sub-quad coefficient 612 with the difference divided by a quantity of one less than a quantity of N divided by two. 'n' refers to a column of one of the quantization coefficients 210 being calculated. 'N' refers to row and column size of the quantization matrix 402.

The encoder prediction unit 208 can include a middle column module 712, which is defined as a block that estimates numerical values of the quantization coefficients 210 in a first half of a middle column of the quantization matrix 402. The middle column module 712 can estimate the middle column coefficient 620 of FIG. 6.

The middle column coefficient 620 can be estimated based on the right-top sub-quad coefficient 610 and the right-bottom sub-quad coefficient 614. The middle column coefficient 620 can be estimated as follows.

$$QM[m][N/2]=QM[0][N/2]+m*INT((QM[N/2][N/2]-QM[0][N/2])/(N/2-1)) \quad (5)$$

for m=1 to N/2−1 and N=8.

The middle column coefficient 620 can be estimated by calculating a sum of the right-top sub-quad coefficient 610 and a product of m and an integer component of a quantity of a difference of the right-bottom sub-quad coefficient 614 and the right-top sub-quad coefficient 610 with the difference divided by a quantity of one less than a quantity of N divided by two. 'm' refers to a row of one of the quantization coefficients 210 being calculated. 'N' refers to row and column size of the quantization matrix 402.

The encoder prediction unit 208 can include a first-half last row module 714, which is defined as a block that estimates numerical values of the quantization coefficients 210 in a first half of the last row 622 of FIG. 6 of the quantization matrix 402. The first-half last row module 714 can estimate the first-half last row coefficient 624 of FIG. 6. The first-half last row coefficient 624 can be estimated based on the left-bottom sub-quad coefficient 612 and the right-bottom sub-quad coefficient 614. The first-half last row coefficient 624 can be estimated as follows.

$$QM[N-1][n]=QM[N-1][0]+n*INT((QM[N/2][N/2]-QM[N/2][0])/(N/2-1)) \quad (6)$$

for n=1 to N/2−1 and N=8.

The first-half last row coefficient 624 can be estimated by calculating a sum of one of the corner seeds 604 in the last row 622 and a product of n and an integer component of a quantity of a difference of the right-bottom sub-quad coefficient 614 and the left-bottom sub-quad coefficient 612 with the difference divided by a quantity of one less than a quantity of N divided by two. 'n' refers to a column of one of the quantization coefficients 210 being calculated. 'N' refers to row and column size of the quantization matrix 402.

The encoder prediction unit 208 can include a second-half last row module 716, which is defined as a block that estimates numerical values of the quantization coefficients 210 in a second half of the last row 622 of the quantization matrix 402.

The second-half last row module 716 can estimate the second-half last row coefficient 626 of FIG. 6. The second-half last row coefficient 626 can be estimated based on the first-half last row coefficient 624 in the first half of the last row 622 and one of the corner seeds 604 in the last row 622. The second-half last row coefficient 626 can be estimated as follows.

$$QM[N-1][n+N/2-1]=QM[N-1][N/2-1]+n*\text{INT}((QM[N-1][N-1]-QM[N-1][N/2-1])/(N/2)) \quad (7)$$

for n=1 to N/2−1 and N=8.

The second-half last row coefficient 626 can be estimated by calculating a sum of the first-half last row coefficient 624 in the first half of the last row 622 and a product of n and an integer component of a quantity of a difference of one of the corner seeds 604 in the last row 622 and the first-half last row coefficient 624 with the difference divided by a quantity of N divided by two. 'n' refers to a location offset from the first-half last row coefficient 624. 'N' refers to row and column size of the quantization matrix 402.

The encoder prediction unit 208 can include a first-half last column module 718, which is defined as a block that estimates numerical values of the quantization coefficients 210 in the first half of the last column 628 of FIG. 6 of the quantization matrix 402.

The first-half last column module 718 can estimate the first-half last column coefficient 630 of FIG. 6. The first-half last column coefficient 630 can be estimated based on one of the corner seeds 604 in the last column 628 and the right-bottom sub-quad coefficient 614. The first-half last column coefficient 630 can be estimated as follows.

$$QM[m][N-1]=QM[0][N-1]+m*\text{INT}((QM[N/2][N/2]-QM[0][N/2])/(N/2-1)) \quad (8)$$

for m=1 to N/2−1 and N=8.

The first-half last column coefficient 630 can be estimated by calculating a sum of one of the corner seeds 604 in the first row 606 and a product of m and an integer component of a quantity of a difference of the right-bottom sub-quad coefficient 614 and the right-top sub-quad coefficient 610 with the difference divided by a quantity of one less than a quantity of N divided by two. 'm' refers to a row of the first-half last column coefficient 630. 'N' refers to row and column size of the quantization matrix 402.

The encoder prediction unit 208 can include a second-half last column module 720, which is defined as a block that estimates numerical values of the quantization coefficients 210 in a second half of the last column 628 of the quantization matrix 402. The second-half last column module 720 can estimate the second-half last column coefficient 632 of FIG. 6.

The second-half last column coefficient 632 can be estimated based on the first-half last column coefficient 630 in the first half of the last column 628 and one of the corner seeds 604 in the last row 622. The second-half last column coefficient 632 can be estimated as follows.

$$QM[m+N/2-1][N-1]=QM[N/2-1][N-1]+m*\text{INT}((QM[N-1][N-1]-QM[N/2-1][N-1])/(N/2)) \quad (9)$$

for m=1 to N/2−1 and N=8.

The second-half last column coefficient 632 can be estimated by calculating a sum of the first-half last column coefficient 630 and a product of m and an integer component of a quantity of a difference of the right-bottom sub-quad coefficient 614 and one of the corner seeds 604 in the last column 628 with the difference divided by a quantity of N divided by two. 'm' refers to a relative position from the first-half last column coefficient 630. 'N' refers to row and column size of the quantization matrix 402.

The encoder prediction unit 208 can include a remaining element module 722, which is defined as a block that estimates numerical values of the quantization coefficients 210 that have not been previously interpolated. The remaining element module 722 can estimate the remaining coefficients 634 of FIG. 6. The remaining coefficients 634 can be generated based on the zigzag scan order 602 of FIG. 6. The remaining coefficients 634 can be estimated using the following pseudo-code.

```
// Q-matrix (QM) into an array form:
copyMatrix2Array(QM,QM_Array1);
count = 0;
for (k=0; k<N*N; k++) {
    dat1 = QM_Array2[k] = QM_Array1[zigzag_scan[k]];
    if (dat1==0) count++;
    else if (count && (k > count)) {
        dat2 = QM_Array2[k-count-1]; diff = (dat2-dat1);
        if (count ==1) diff /= 2;
        for (m=0; m<count; m++)
            QM_Array2[k-count+m] = dat1 + (m+1)*(diff/count);
        count = 0;
    }
}
```

The remaining element module 722 can generate an element count 724 (count), which is initialized to zero at the beginning of an operation of calculating the remaining coefficients 634. The remaining element module 722 can generate a loop count 726($k$), which is set up to increment for $N^2$ times or iterations.

The element count 724 is defined as a numerical value that indicates a number of times a predefined condition is detected. The loop count 726 is defined as a numerical value that indicates a position of one of the remaining coefficients 634 in the zigzag scan order 602. For example, N equals to 8 and the loop count 726 is executed 64 times when the quantization matrix 402 is an 8×8 matrix.

The remaining element module 722 can generate a coefficient array 728, which is defined as a set of numerical values of the quantization coefficients 210 in the zigzag scan order 602. The remaining element module 722 can increment the element count 724 when a numerical value of one of the quantization coefficients 210, in the coefficient array 728 as indicated by the loop count 726, is detected as not calculated since the numerical value is zero. Thus, the element count 724 can indicate a number of the quantization coefficients 210 that are not calculated yet in the coefficient array 728.

The remaining element module 722 can generate a front coefficient 730 (dat1) and a back coefficient 732 (dat2). The front coefficient 730 is defined as a numerical value of one of the quantization coefficients 210 that is previously calculated and is located before a number of the quantization coefficients 210 that are not calculated. The back coefficient 732 is defined as a numerical value of one of the quantization coefficients 210 that is previously calculated and is located after a number of the quantization coefficients 210 that are not calculated. The front coefficient 730 and the back coefficient 732 are relatively before and after the number of the quantization coefficients 210 that are not calculated in the zigzag scan order 602.

The remaining element module 722 can generate a coefficient difference 734, which is defined as a numerical value of a difference between numerical values of the back coefficient 732 and the front coefficient 730. If a numerical value of the element count 724 is one, the coefficient difference 734 is divided by two.

Each of the remaining coefficients 634 that is not calculated yet can be calculated by the remaining element module 722 based on the element count 724, the loop count 726, the coefficient array 728, the front coefficient 730, the back coefficient 732, the coefficient difference 734, and a coefficient position 736. Each of the remaining coefficients 634 can be calculated to be a sum of a numerical value of the front coefficient 730 and a product of the coefficient position 736 added by one and the coefficient difference 734 divided by the element count 724.

The coefficient position 736 is defined as a numerical value that indicates a location of one of the quantization coefficients 210 that is not calculated yet. The coefficient position 736 is a relative position from a location of the back coefficient 732 in the zigzag scan order 602.

For illustration purposes, the control flow of the encoder prediction unit 208 is described using the quantization matrix 402 of an 8×8 matrix, although it is understood that the encoder prediction unit 208 can be executed to interpolate the quantization matrix 402 of any size.

The seed module 702 can be coupled to the first row module 704. The first column module 706 can be coupled to the first row module 704 and the sub-quad element module 708. The middle row module 710 can be coupled to the sub-quad element module 708 and the middle column module 712.

The first-half last row module 714 can be coupled to the middle column module 712 and the second-half last row module 716. The first-half last column module 718 can be coupled to the second-half last row module 716 and the second-half last column module 720. The remaining element module 722 can be coupled to the second-half last column module 720.

The video system 100 of FIG. 1 can include the quantization matrix 402 predicted with a multi-layered coding approach including the corner seeds 604, the first row 606, the first column 608, the right-bottom sub-quad coefficient 614, the middle row coefficient 618, and the middle column coefficient 620. The multi-layered coding approach also includes the first-half last row coefficient 624, the second-half last row coefficient 626, the first-half last column coefficient 630, the second-half last column coefficient 632, and the remaining coefficients 634.

The multi-layer coding approach enables transmitting the quantization coefficients 210 in the quantization matrix 402 over multiple frame-periods or in a progressively built-up mechanism thereby sending less number of bits per frame-period. The multi-layer coding approach also enables stretching a transmission of such bits over a longer period and helps adaptation in re-building the quantization matrix 402 at a decoder-end including the video decoder 302 of FIG. 3.

The present invention benefits from updating, which adapts to real-time distributions of events by updating each layer of coded bits since the real-time distributions of the events vary. During transmission of the coded bits for the quantization matrix 402 (QM[ ][ ]), bits from each layer can be coded separately. As a result, the quantization matrix 402 at the receiver end can be progressively updated since the coding operation of the quantization matrix 402 is a multi-layered coding process. Each of these layers can be coded step-by-step in multiple phases.

Based on fluctuating bit-rates in a transmission line in a network including mobile and internet, the encoder prediction unit 208 can adaptively adjust coding of the quantization matrix 402 in multiple bit-chunks. The encoder prediction unit 208 can transmit the coded bits based on an available bit-rate of the transmission line thereby adapting to the available bit-rate.

It has been discovered that the seed module 702 provides improved prediction of the quantization coefficients 210 with the corner seeds 604 selected from numerical values of a default quantization matrix or a previously predicted quantization matrix resulting in reduced number of bits to transmit the quantization matrix 402 to a receiver-end including the video decoder 302 while the video decoder 302 decodes a compressed video bitstream including the video bitstream 206 of FIG. 2.

It has also been discovered that the quantization coefficients 210 in the first row 606 generated by the first row module 704 and the quantization coefficients 210 in the first column 608 generated by the first column module 706 provide improved prediction with the quantization coefficients 210 generated based on neighbor coefficients including the corner seeds 604.

It has further been discovered that the middle row coefficient 618 generated by the middle row module 710 and the middle column coefficient 620 generated by the middle column module 712 provide improved performance in terms of having better prediction of coefficients using neighbor coefficients, which are either pre-selected at specific corner-elements including the corner seeds 604 of the quantization matrix 402 or predicted earlier.

It has further been discovered that the first-half last row module 714, the second-half last row module 716, the first-half last column module 718, and the second-half last column module 720 provide improved performance with the first-half last row coefficient 624, the second-half last row coefficient 626, the first-half last column coefficient 630, and the second-half last column coefficient 632 having reduced prediction errors with lower spread in Histogram.

It has further been discovered that the remaining coefficients 634 generated by the remaining element module 722 provides improved prediction with the remaining coefficients 634 generated based on the element count 724, the loop count 726, the coefficient array 728, the coefficient difference 734, the coefficient position 736, and neighbor coefficients including the front coefficient 730 and the back coefficient 732 thereby enabling the video encoder 202 of FIG. 2 needing less number of bits assigned using statistical coding (Huffman) with the variable length coding unit 214 of FIG. 2 in either a lossy mode or a lossless mode.

The physical transformation of the quantization coefficients 210 used to encode the video input data 204 of FIG. 2 to the video bitstream 206 and the dequantization coefficients 308 of FIG. 3 used to decode the video bitstream 206 to the reconstructed video data 312 of FIG. 3 results in movement in the physical world, such as people using the video device 102 of FIG. 1, based on the operation of the video system 100. As the movement in the physical world occurs, the movement itself creates additional information that is converted back to calculation of the quantization coefficients 210 and the dequantization coefficients 308 for the continued operation of the video system 100 and to continue the movement in the physical world.

Thus, it has been discovered that the video system 100 of the present invention furnish or furnishes important and heretofore unknown and unavailable solutions, capabilities, and functional aspects for a video system with quantization matrix coding.

The video system 100 describes the module functions or order as an example. The modules can be partitioned differently. For example, the first row module 704 and the first column module 706 can be implemented as one module. Each of the modules can operate individually and independently of the other modules.

Figure 8:
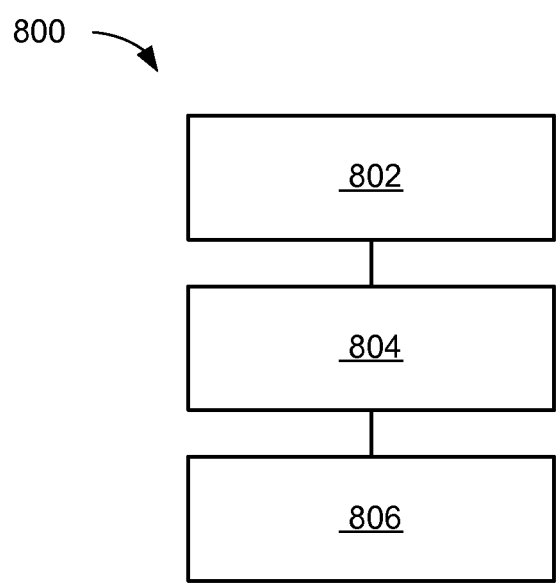
FIG. 8 is a flow chart of a method of operation of the video system of FIG. 1 in a further embodiment of the present invention.

Referring now to FIG. 8, therein is shown a flow chart of a method 800 of operation of the video system 100 of FIG. 1 in a further embodiment of the present invention. The method 800 includes: generating a quantization matrix for a video input data, the quantization matrix having a corner seed and a right-bottom sub-quad coefficient estimated based on the corner seed in a block 802; generating a video bitstream based on the quantization matrix in a block 804; and generating a reconstructed video data with the video bitstream for displaying on a video device in a block 806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a video system comprising:
generating a quantization matrix for a video input data, the quantization matrix having a number of rows, corner seeds, and a right-bottom sub-quad coefficient estimated by calculating a sum of one of the corner seeds and a product as a function of two of the corner seeds and the number of the rows;
generating a video bitstream based on the quantization matrix; and
generating a reconstructed video data with the video bitstream for displaying on a video device.

2. The method as claimed in claim 1 wherein generating the quantization matrix includes generating the quantization matrix having a middle row coefficient estimated based on the right-bottom sub-quad coefficient.

3. The method as claimed in claim 1 wherein generating the quantization matrix includes generating the quantization matrix having a middle column coefficient estimated based on the right-bottom sub-quad coefficient.

4. The method as claimed in claim 1 wherein generating the quantization matrix includes generating the quantization matrix having a first-half last row coefficient estimated based on the right-bottom sub-quad coefficient.

5. The method as claimed in claim 1 wherein generating the quantization matrix includes generating the quantization matrix having a second-half last row coefficient estimated based on the corner seed.

6. A method of operation of a video system comprising:
generating a quantization matrix for a video input data, the quantization matrix having a number of rows, corner seeds, and a right-bottom sub-quad coefficient estimated by calculating a supra of one of the corner seeds and a product as a function of two of the corner seeds and the number of the rows, wherein the corner seeds are in a first row of the quantization matrix and a last row of the quantization matrix;
generating a video bitstream based on the quantization matrix; and
generating a reconstructed video data with the video bitstream for displaying on a video device.

7. The method as claimed in claim 6 wherein generating the quantization matrix includes generating the quantization matrix having a middle row coefficient estimated based on a left-bottom sub-quad coefficient and the right-bottom sub-quad coefficient.

8. The method as claimed in claim 6 wherein generating the quantization matrix includes generating the quantization matrix having a middle column coefficient estimated based on a right-top sub-quad coefficient and the right-bottom sub-quad coefficient.

9. The method as claimed in claim 6 wherein generating the quantization matrix includes generating the quantization matrix having a first-half last row coefficient estimated based on a left-bottom sub-quad coefficient and the right-bottom sub-quad coefficient.

10. The method as claimed in claim 6 wherein generating the quantization matrix includes generating the quantization matrix having a second-half last row coefficient estimated based on a first-half last row coefficient and one of the corner seeds.

11. A video system comprising:
an encoder prediction unit for generating a quantization matrix for a video input data, the quantization matrix having a number of rows, corner seeds, and a right-bottom sub-quad coefficient estimated by calculating a sum of one of the corner seeds and a product as a function of two of the corner seeds and the number of the rows;
a variable length coding unit, coupled to the encoder prediction unit, for generating a video bitstream based on the quantization matrix; and
a decoder prediction unit, coupled to the variable length coding unit, for generating a reconstructed video data with the video bitstream for displaying on a video device.

12. The system as claimed in claim 11 wherein the encoder prediction unit includes a middle row module for generating the quantization matrix having a middle row coefficient estimated based on the right-bottom sub-quad coefficient.

13. The system as claimed in claim 11 wherein the encoder prediction unit includes a middle column module for generating the quantization matrix having a middle column coefficient estimated based on the right-bottom sub-quad coefficient.

14. The system as claimed in claim 11 wherein the encoder prediction unit includes a first-half last row module for generating the quantization matrix having a first-half last row coefficient estimated based on the right-bottom sub-quad coefficient.

15. The system as claimed in claim 11 wherein the encoder prediction unit includes a second-half last row module for generating the quantization matrix having a second-half last row coefficient estimated based on the corner seed.

16. The system as claimed in claim 11 wherein the encoder prediction unit includes a sub-quad element module for generating the quantization matrix having the corner seeds in a first row of the quantization matrix and a last row of the quantization matrix.

17. The system as claimed in claim 16 wherein the encoder prediction unit includes a middle row module for generating the quantization matrix having a middle row coefficient estimated based on a left-bottom sub-quad coefficient and the right-bottom sub-quad coefficient.

18. The system as claimed in claim 16 wherein the encoder prediction unit includes a middle column module for generating the quantization matrix having a middle column coefficient estimated based on a right-top sub-quad coefficient and the right-bottom sub-quad coefficient.

19. The system as claimed in claim 16 wherein the encoder prediction unit includes a first-half last row module for generating the quantization matrix having a first-half last row coefficient estimated based on a left-bottom sub-quad coefficient and the right-bottom sub-quad coefficient.

20. The system as claimed in claim 16 wherein the encoder prediction unit includes a second-half last row module for generating the quantization matrix having a second-half last row coefficient estimated based on a first-half last row coefficient and one of the corner seeds.

* * * * *